United States Patent
Jeon

(10) Patent No.: US 8,666,573 B2
(45) Date of Patent: Mar. 4, 2014

(54) SHIFT CONTROL SYSTEM AND SHIFT CONTROL METHOD FOR HYBRID VEHICLE

(75) Inventor: Byeongwook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 114 days.

(21) Appl. No.: 12/949,398

(22) Filed: Nov. 18, 2010

(65) Prior Publication Data

US 2012/0053768 A1    Mar. 1, 2012

(30) Foreign Application Priority Data

Aug. 31, 2010   (KR) .................. 10-2010-0085146

(51) Int. Cl.
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .......................................................... 701/22

(58) Field of Classification Search
USPC ............... 701/22, 51, 67; 180/65.1, 65.21, 180/65.265, 65.28, 65.285
See application file for complete search history.

(56) References Cited

U.S. PATENT DOCUMENTS

| | | | | |
|---|---|---|---|---|
| 4,263,826 A * | 4/1981 | Hartz et al. | ...................... | 477/30 |
| 6,422,972 B1 * | 7/2002 | Eguchi | ........................... | 477/107 |
| 6,459,980 B1 * | 10/2002 | Tabata et al. | ................... | 701/70 |
| 6,719,076 B1 * | 4/2004 | Tabata et al. | ................ | 180/65.7 |
| 7,770,678 B2 * | 8/2010 | Nozaki et al. | ............... | 180/65.6 |
| 2008/0224478 A1 * | 9/2008 | Tamor | ........................ | 290/40 C |
| 2010/0312427 A1 * | 12/2010 | Ueno | ............................. | 701/22 |
| 2012/0053768 A1 * | 3/2012 | Jeon | .............................. | 701/22 |
| 2012/0089290 A1 * | 4/2012 | Kato et al. | ...................... | 701/22 |

FOREIGN PATENT DOCUMENTS

JP   10-002241 A   1/1998

* cited by examiner

*Primary Examiner* — Khoi Tran
*Assistant Examiner* — Harry Oh
(74) *Attorney, Agent, or Firm* — Morgan, Lewis & Bockius LLP

(57) ABSTRACT

A shift control system for a hybrid vehicle having an engine and a motor as power sources may include a driving condition detector which detects whether a kick-down shift-request occurs in EV (Electric Vehicle), and a hybrid control unit which changes a driving mode from the EV (Electric Vehicle) mode to HEV (Hybrid Electric Vehicle) mode by connecting an engine clutch when the kick-down shift-request may be detected and an engine may be operated, and executes a kick-down shift.

3 Claims, 5 Drawing Sheets

SHIFT CONTROL SYSTEM AND SHIFT CONTROL METHOD FOR HYBRID VEHICLE

CROSS-REFERENCE TO RELATED APPLICATION

The present application claims priority to Korean Patent Application No. 10-2010-0085146 filed in the Korean Intellectual Property Office on Aug. 31, 2010, the entire contents of which is incorporated herein for all purposes by this reference.

BACKGROUND OF THE INVENTION

1. Field of the Invention

The present invention relates to a hybrid vehicle. More particularly, the present invention relates to a shift control system and a shift control method for a hybrid vehicle which provides an active kick-down shift according to operations of an engine in EV mode.

2. Description of Related Art

Because of demands for enhancement of fuel efficiency and reinforcement of exhaust gas regulations, eco-friendly vehicles have been researched. A hybrid vehicle is one type of such eco-friendly vehicles and attracts public attention.

The hybrid vehicle uses an engine and a motor as power sources, and enhances energy efficiency and reduces exhaust gas by selectively using the engine and the motor as the power sources. In order to minimize cost and torque loss, an engine clutch operated by fluid, instead of a torque converter, is mounted between the engine and the motor in the hybrid vehicle.

The engine clutch mounted in the hybrid vehicle connects or disconnects the engine and the motor according to a driving condition such that torque transmitted to the transmission is optimized.

Driving modes of the hybrid vehicle is divided into engine mode, driving by an engine, EV (Electric Vehicle) mode, driving by a motor, and HEV (Hybrid Electric Vehicle) mode, driving by an engine and a motor simultaneously.

Thus, how to harmonize power sources of the engine and the motor leads to enhancement of fuel efficiency.

In the conventional art, when a kick-down shift-request occurs for quick acceleration in the EV mode, a hybrid control unit (HCU) executes a kick-down shift during operation of a motor.

However, as shown in FIG. 4, since the more rotation speed of a motor is increased, the more torque is reduced, even if gear ratio is increase with a kick-down shift, sufficient acceleration may not be realized.

That is, motor rotation speed is increased with the kick-down shift but acceleration may be deteriorated and un-synchronized acceleration may happen.

In the conventional art, to solve the above problem, as shown in FIG. 5, when a kick-down shift from i shift to i-n shift is requested in the EV mode, a kick-down shift is prohibited and an engine is started using ISG (Idle Stop and Go).

After the engine start is completed, an engine clutch is engaged, and a kick-down shift of HEV mode is executed from the moment of power transmission of the engine.

However, above method also generates excessive acceleration dead zone time, which starts from the moment a kick-down shift is required to the moment the engine starts and the engine clutch is completely engaged, that is, real power transmission is too delayed.

Consequently, the conventional method may not improve acceleration response of a kick-down shift in EV mode of a hybrid vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a shift control system and a shift control method for a hybrid vehicle which provides an active kick-down shift according to operations of an engine in EV mode.

In an aspect of the present invention, the shift control system for a hybrid vehicle comprising an engine and a motor as power sources, may include a driving condition detector which detects whether a kick-down shift-request occurs in EV (Electric Vehicle), and a hybrid control unit which changes a driving mode from the EV (Electric Vehicle) mode to HEV (Hybrid Electric Vehicle) mode by connecting an engine clutch when the kick-down shift-request may be detected and an engine may be operated, and executes a kick-down shift.

The hybrid control unit executes the kick-down shift in the EV mode when the kick-down shift-request may be detected and the engine may be not operated.

The hybrid control unit delays the kick-down shift until the connection of the engine clutch may be completed.

In another aspect of the present invention, the shift control method for hybrid vehicle may include detecting whether a kick-down shift-request occurs in EV (Electric Vehicle) mode, determining whether an engine may be operated when the kick-down shift-request may be detected, executing the kick-down shift in the EV mode when the engine may be not operated, delaying the kick-down shift when the engine may be operated, and changing driving mode from the EV mode to HEV (Hybrid Electric Vehicle) mode by connecting an engine clutch, and executing the kick-down shift when changing the driving mode from the EV mode to the HEV mode may be completed, wherein the hybrid vehicle may include the engine and the motor as power sources, a driving condition detector which detects whether the kick-down shift-request occurs, and a hybrid control unit which selectively changes the driving mode from the EV mode to the HEV mode by connecting the engine clutch.

The shift control system and the shift control method for a hybrid vehicle according to the exemplary embodiment of the present invention may minimize acceleration dead zone time.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
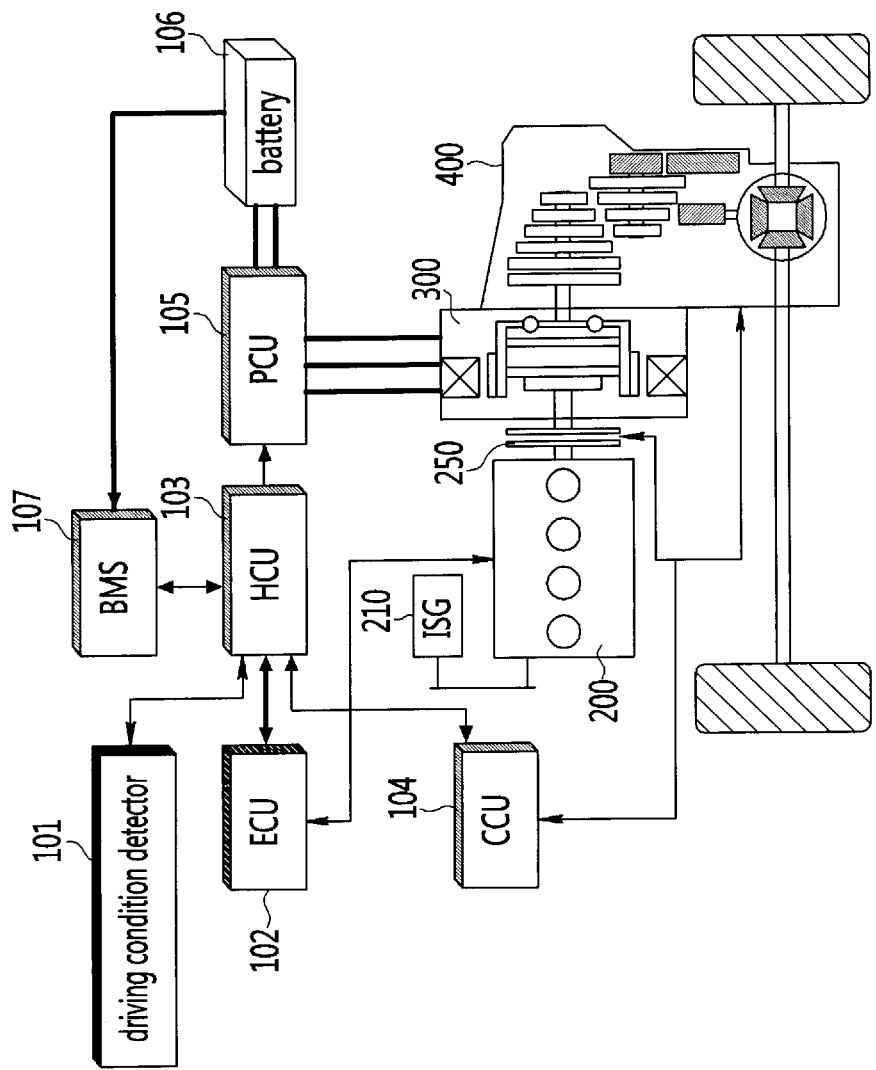
FIG. 1 is a drawing showing a shift control system for a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, referring to the drawings, exemplary embodiments of the present invention will be described in detail.

FIG. 1 is a drawing showing a shift control system for a hybrid vehicle according to an exemplary embodiment of the present invention.

Referring to FIG. 1, a shift control system for a hybrid vehicle according to an exemplary embodiment of the present invention includes a driving condition detector 101, an ECU (Engine Control Unit: 102), a HCU (Hybrid Control Unit: 103), a CCU (Clutch Control Unit: 104), a PCU (Power Control Unit: 105), a battery 106, a BMS (Battery Management System: 107), an engine 200, an engine clutch 250, a motor 300, and a transmission 400.

The driving condition detector 101 detects information of a deceleration request, an acceleration request or a kick-down shift and transmits the information to the HCU 103.

The driving condition detector 101 includes a brake pedal sensor, which detects operation of a brake pedal, and an APS (Accelerator Pedal Sensor), which detects operation of an acceleration pedal.

The ECU 102 is connected to the HCU 103 through a network and cooperates with the HCU 103 for controlling an operation of the engine 200.

The HCU 103, is the uppermost controller, controls all the operation of the hybrid vehicle by controlling lower controllers connected thereto through the network, and gathers and analyzes information of the lower controllers.

The HCU 103 detects whether the engine 300 is operated or not, when the driving condition detector 101 detects a kick-down shift-request in EV mode, and the HCU 103 actively controls kick-down shift according to whether the engine 300 is operated or not and thus optimized acceleration responsiveness may be realized.

The HCU 103 executes the kick-down shift in the EV mode if the kick-down shift-request occurs in EV mode and the engine 200 is not operated.

If the kick-down shift-request occurs in EV mode and the engine 200 is operated, for example, for idle charging and so on, the HCU 103 prohibits the kick-down shift and connects the engine clutch 250 through the CCU 104, changes driving mode from EV mode to HEV mode and then executes the kick-down shift through the CCU 104 for supplying optimized acceleration response after completion of the driving mode change to the HEV mode.

When the kick-down shift-request occurs in EV mode and the engine 200 is operated, the HCU 103 prohibits the kick-down shift and engages the engine clutch 250 for gaining first acceleration response, and secondary acceleration response may be obtained after the kick-down shift, and thus the DEAD ZONE dead zone, which starts from the moment the kick-down shift is required to the moment, real acceleration starts, may be minimized.

The CCU 104 controls actuators mounted in the transmission 400 according to the control of the HCU 20 so as to control a shift to a target shift-speed, engages or disengages the engine clutch 250 by controlling hydraulic pressure supplied to the engine clutch 250, and controls power delivery of the engine 200.

The PCU 105 includes a motor control unit (MCU), an inverter provided with a plurality of electric switching elements and protection circuit. The PCU 105 converts DC voltage supplied from the battery 106 into 3-phase AC voltage according to a control signal transmitted from the HCU 104 and drives the motor 300.

An insulated gate bipolar transistor (IGBT), a MOSFET, a transistor can be used as the electric switching element.

The protection circuit provided to the PCU 105 monitors the current flowing. If the overcurrent flows or the overvoltage is applied to the PCU 107 and the battery 108, the protection circuit disconnects the battery so as protect all the systems in the hybrid vehicle and passengers.

The battery 106 supplies the voltage to the motor 300 assisting output of the engine 200 in the HEV mode, and is recharged by the voltage generated in the motor 300.

The battery 106 supplies the power to the motor 300 in EV mode, and is recharged thorough the regenerative braking.

The BMS 107 detects information about a voltage, a current, and a temperature of a battery 106, controls a state of charge (SOC), a recharge current, and discharge current.

The engine 200 is controlled by the control of the ECU 20 to drive optimally.

The ISG 210 idle stops or starts the engine 200 according to a driving condition of the vehicle.

The engine clutch 250 is disposed between the engine 200 and the motor 300 and connects or disconnects the engine 200 and the motor 300 according to the drive mode (e.g., the engine mode, the hybrid mode, and the electric mode) by control of the CCU 104.

The motor 300 is driven by the 3-phase AC voltage according to the control of the PCU 105 so as to assist the output torque of the engine 200, and operates as the generator in a case that output of the engine 200 is excessive or the vehicle brakes.

The transmission 400 adjusts the shift-speed (or the speed ratio) according to the control of the CCU 104 and transmits the output torque to a driving wheel by selectively summing up torques of the engine 200 and the motor 300 according to the drive mode so as to run the vehicle.

A conventional automatic transmission or CVT may be used as the transmission 400.

Operation of the hybrid vehicle according to the present exemplary embodiment is the same as or similar to that of a conventional hybrid vehicle, and thus a detailed description will be omitted.

The kick-down shift in EV mode will be described in detail in this specification.

Figure 2:
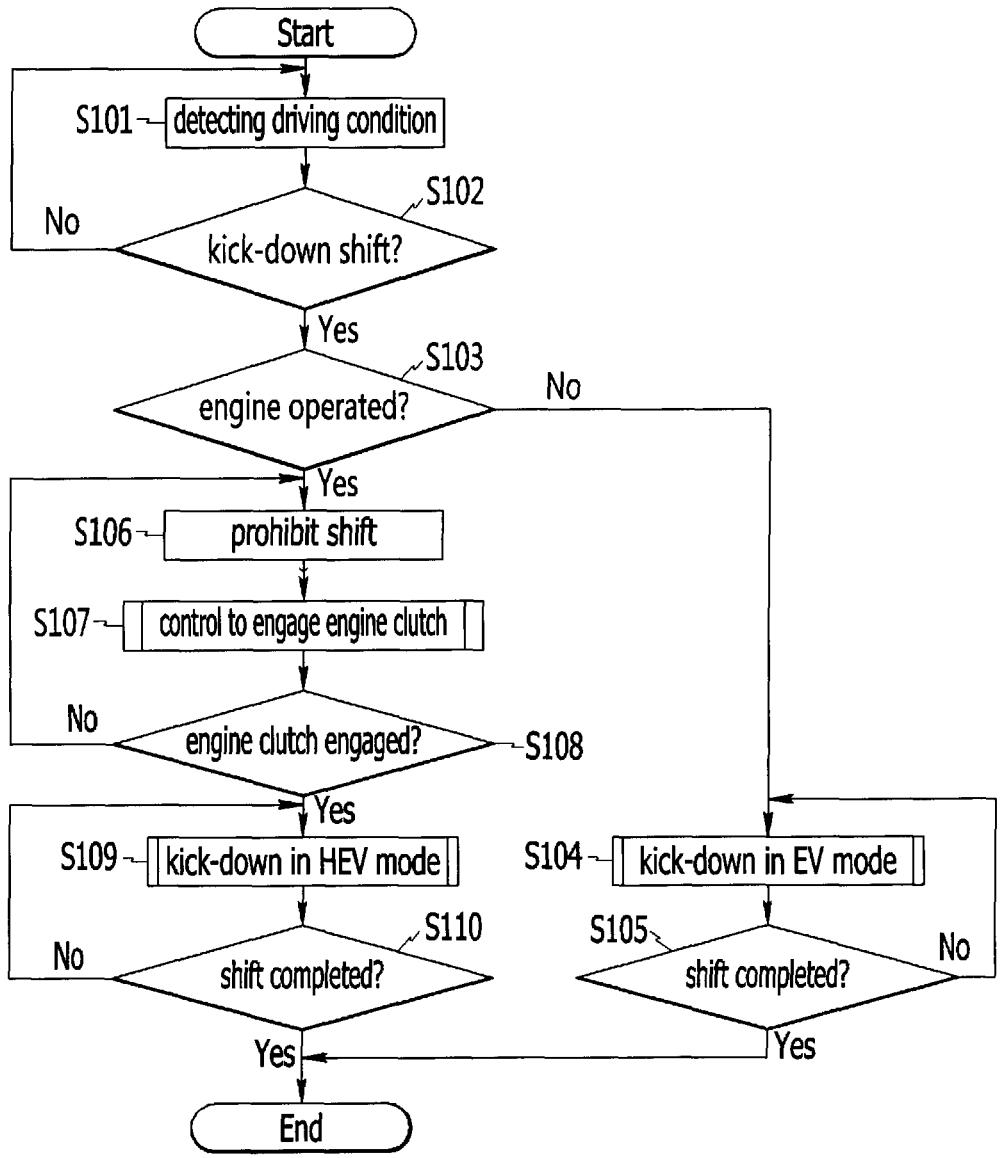
FIG. 2 is a flowchart of a shift control method for a hybrid vehicle according to an exemplary embodiment of the present invention.

FIG. 2 is a flowchart of a shift control method for a hybrid vehicle according to an exemplary embodiment of the present invention.

The driving condition detector 101 detects driving information in the EV mode and transmits the information to the HCU 103, the uppermost controller (S101).

The HCU 103 analysis the information from the driving condition detector 101, and determines whether a kick-down shift-request occurs (S102).

If it is determined that the kick-down shift-request does not occur in the step S102, it is returned to the step S101, and if it is determined that the kick-down shift-request occurs in the step S102, the HCU 103 analysis the information about the engine 200 from the ECU 102 and determines that the engine 200 is operated, for example, for idle charging and so on (S103).

In the step the S103, it is determined that the engine 200 is not operated, that means the engine stops, the HCU 103 executes the kick-down shift in the EV mode (S104), and stops the kick-down shift when a shifting condition is satisfied (S105).

If the kick-down shift-request occurs in EV mode and the engine 200 is operated, for example, for idle charging and so on in the step S103, the HCU 103 prohibits the kick-down shift (S106), controls the CCU 104 to engage the engine clutch 250, and changes driving mode from EV mode to HEV mode (S107).

The HCU determines that driving mode from EV mode to HEY mode has been changed (S108), and then executes the kick-down shift through the CCU 104 for supplying optimized acceleration response after completion of the driving mode change to the HEV mode (S109 and S110).

Figure 3:
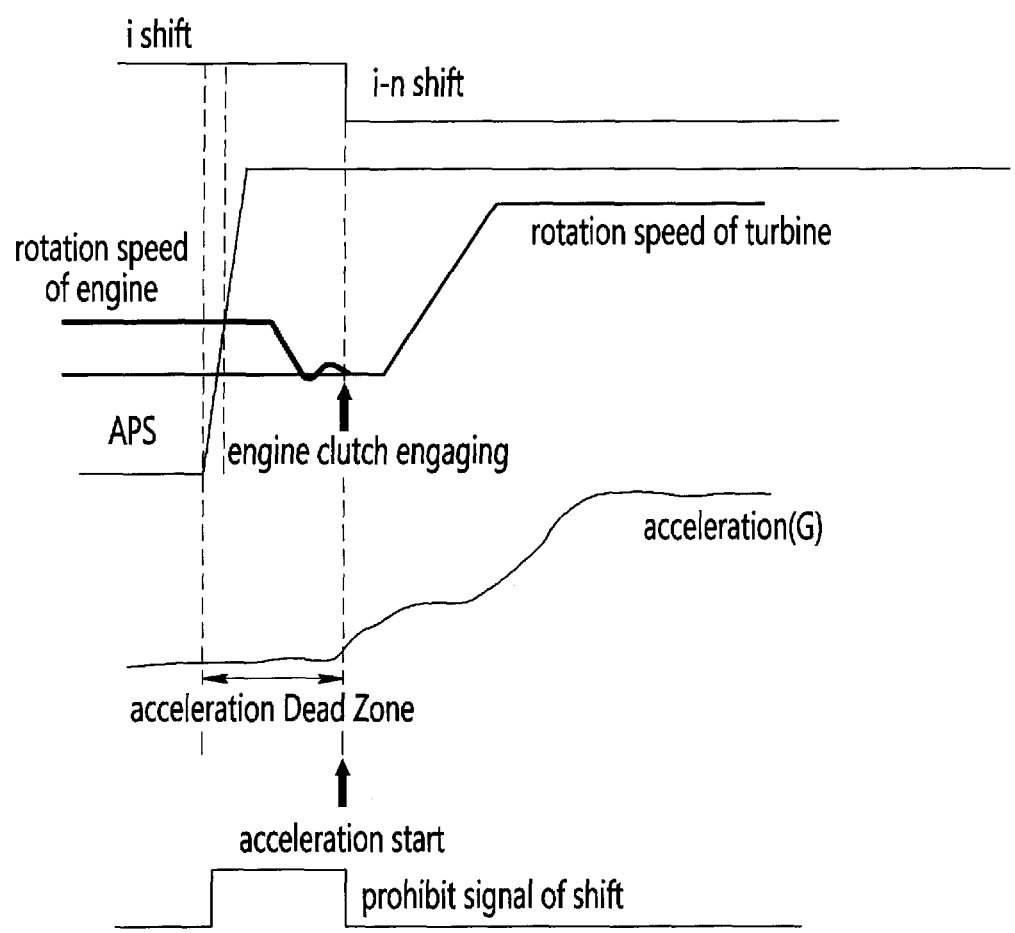
FIG. 3 is a graph showing a shift control method for a hybrid vehicle according to an exemplary embodiment of the present invention.
Figure 4:
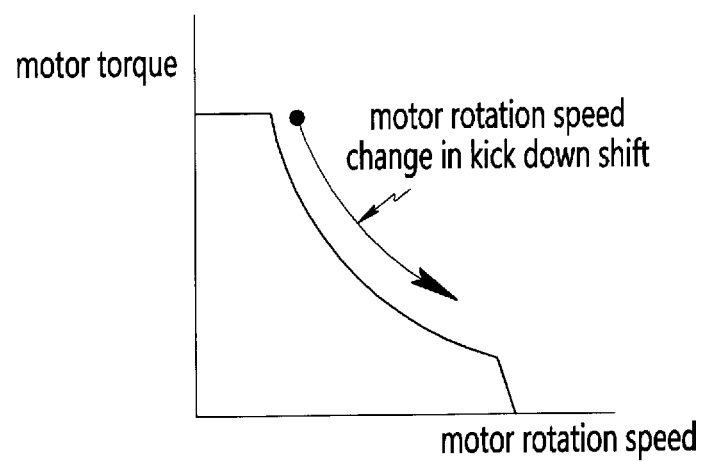
FIG. 4 is a graph showing torque characteristic of a motor of a hybrid vehicle.
Figure 5:
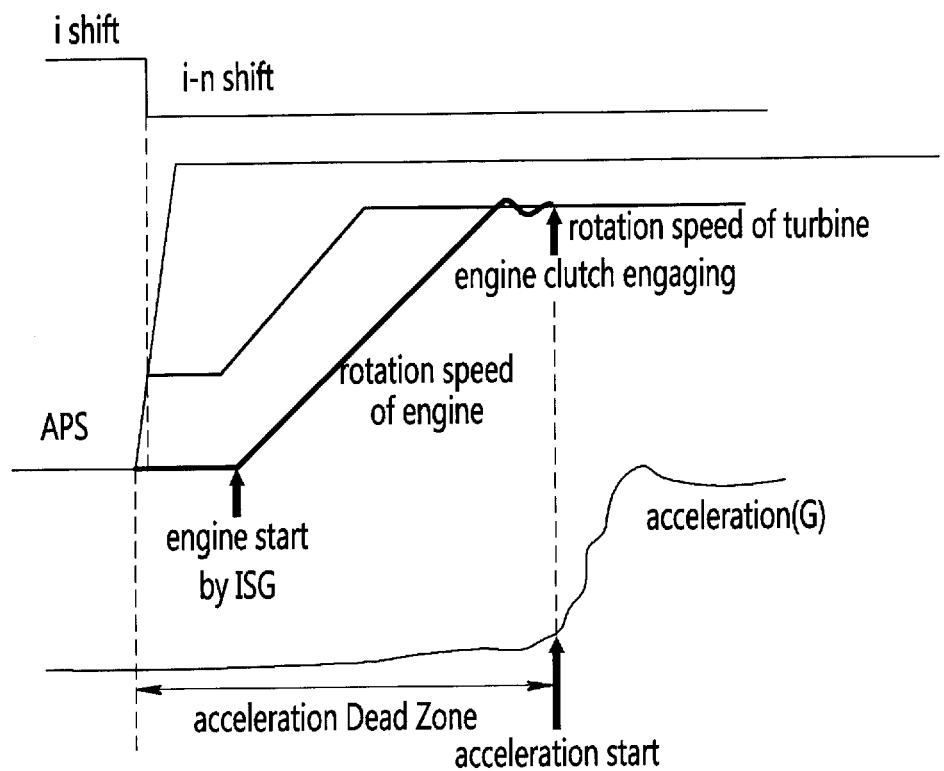
FIG. 5 is a graph showing a shift control method for a hybrid vehicle according to a conventional art.

As shown in FIG. 3, when a kick-down shift from i shift to i-n shift is requested in the EV mode according to rapid change of the APS, and the engine 200 is operated, the kick-down shift is prohibited and the engine clutch 250 is engaged for gaining first acceleration response, and secondary acceleration response may be obtained after the kick-down shift, and thus the DEAD ZONE dead zone, which starts from the moment the kick-down shift is required to the moment, real acceleration starts, may be minimized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control system for a hybrid vehicle comprising an engine and a motor as power sources, the system comprising:
    a driving condition detector which detects whether a kick-down shift-request occurs in an EV (Electric Vehicle); and
    a hybrid control unit which changes a driving mode from the EV (Electric Vehicle) mode to an HEV (Hybrid Electric Vehicle) mode by connecting an engine clutch when the kick-down shift-request is detected and an engine is being operated in the EV mode, and executes a kick-down shift in the HEV (Hybrid Electric Vehicle) mode after completion of changing the driving mode from the EV mode to the HEV mode;
    wherein the hybrid control unit executes the kick-down shift in the EV mode when the kick-down shift-request is detected and the engine is not operated.

2. A shift control method in a shift control system for a hybrid vehicle having an engine and a motor as power sources comprising:
    detecting of whether a kick-down shift-request occurs in an EV (Electric Vehicle) mode in the shift control system;
    determining of whether the engine is being operated when the kick-down shift-request is detected in the shift control system;
    executing the kick-down shift in the EV mode in the shift control system when the engine is not operated; and
    delaying the kick-down shift when the kick-down shift-request is detected and the engine is operated in the EV mode, and then changing a driving mode from the EV mode to the HEV (Hybrid Electric Vehicle) mode by connecting an engine clutch while the engine is operated and the kick-down shift-request is detected, and then executing the kick-down shift in the HEV mode after changing the driving mode from the EV mode to the HEV mode is completed.

3. The shift control method for the hybrid vehicle of claim 2, wherein the hybrid vehicle includes:
    the engine and the motor as power sources;
    a driving condition detector which detects whether the kick-down shift-request occurs; and
    a hybrid control unit which selectively changes the driving mode from the EV mode to the HEV mode by connecting the engine clutch.

* * * * *